US012626590B2

(12) United States Patent
Wang

(10) Patent No.: US 12,626,590 B2
(45) Date of Patent: May 12, 2026

(54) COMMUNICATION METHOD, DEVICE AND STORAGE MEDIUM

(71) Applicants: Beijing BOE Technology Development Co., Ltd., Beijing (CN); BOE Technology Group Co., Ltd., Beijing (CN)

(72) Inventor: Youxue Wang, Beijing (CN)

(73) Assignees: Beijing BOE Technology Development Co., Ltd., Beijing (CN); BOE Technology Grouup Co., Ltd., Beijing (CN)

( * ) Notice: Subject to any disclaimer, the term of this patent is extended or adjusted under 35 U.S.C. 154(b) by 0 days.

(21) Appl. No.: 18/284,787

(22) PCT Filed: Jan. 4, 2023

(86) PCT No.: PCT/CN2023/070490
§ 371 (c)(1),
(2) Date: Sep. 28, 2023

(87) PCT Pub. No.: WO2023/131197
PCT Pub. Date: Jul. 13, 2023

(65) Prior Publication Data

US 2024/0371261 A1 Nov. 7, 2024

(30) Foreign Application Priority Data

Jan. 5, 2022 (CN) ......................... 202210005162.9

(51) Int. Cl.
*G08G 1/01* (2006.01)
*G08G 1/0967* (2006.01)

(52) U.S. Cl.
CPC ......... *G08G 1/0145* (2013.01); *G08G 1/0112* (2013.01); *G08G 1/096791* (2013.01)

(58) Field of Classification Search
CPC ............... G08G 1/0145; G08G 1/0112; G08G 1/096791; G08G 1/0967; H04L 67/52
See application file for complete search history.

(56) References Cited

U.S. PATENT DOCUMENTS

2013/0099941 A1* 4/2013 Jana ................ G08G 1/096716
340/905
2017/0132923 A1 5/2017 Li et al.
(Continued)

FOREIGN PATENT DOCUMENTS

CN 103810903 A 5/2014
CN 105070041 A 11/2015
(Continued)

OTHER PUBLICATIONS

CN202210005162.9 first office action.
CN202210005162.9 Notification to grant patent right for invention.

*Primary Examiner* — Rufus C Point
(74) *Attorney, Agent, or Firm* — IPro, PLLC

(57) ABSTRACT

Provided is a communication method, including: acquiring to-be-transmitted target data; acquiring information of parsing conditions required to be satisfied by a node for parsing the target data, wherein the parsing conditions include that a distance between a position of the node for parsing the target data and an initial position is less than or equal to a target distance, the initial position being a position of the first node or an occurrence position of a target event, and the target data indicating the target event; and sending a target message including the information of the parsing conditions and the target data.

12 Claims, 6 Drawing Sheets

(56) References Cited

U.S. PATENT DOCUMENTS

| | | | | |
|---|---|---|---|---|
| 2017/0263125 | A1 | 9/2017 | Tanabe | |
| 2018/0034935 | A1 | 2/2018 | Yeon et al. | |
| 2018/0184261 | A1 | 6/2018 | Ameixieira | |
| 2019/0077399 | A1 * | 3/2019 | Ito | G08G 1/162 |
| 2019/0122543 | A1 * | 4/2019 | Matus | G08G 1/0133 |
| 2019/0202476 | A1 | 7/2019 | Tao et al. | |
| 2019/0206254 | A1 | 7/2019 | Tao et al. | |

FOREIGN PATENT DOCUMENTS

| | | | | |
|---|---|---|---|---|
| CN | 106162731 | A | 11/2016 | |
| CN | 109979238 | A | 7/2019 | |
| CN | 109979239 | A | 7/2019 | |
| CN | 110012090 | A | 7/2019 | |
| CN | 110154882 | A | 8/2019 | |
| CN | 110896534 | A | 3/2020 | |
| CN | 111385748 | A * | 7/2020 | H04W 72/23 |
| CN | 111600925 | A | 8/2020 | |
| CN | 111726285 | A | 9/2020 | |
| CN | 112583529 | A | 3/2021 | |
| CN | 112866327 | A | 5/2021 | |
| CN | 113386786 | A | 9/2021 | |
| CN | 114333384 | A | 4/2022 | |
| EP | 4243373 | A1 | 9/2023 | |
| JP | 2000138915 | A | 5/2000 | |
| JP | 2006323527 | A | 11/2006 | |
| WO | 2019079845 | A1 | 5/2019 | |

* cited by examiner

COMMUNICATION METHOD, DEVICE AND STORAGE MEDIUM

The present disclosure is a U.S. national stage of international application No. PCT/CN2023/070490, filed on Jan. 4, 2023, which claims priority to Chinese Patent Application No. 202210005162.9, filed on Jan. 5, 2022, and entitled "COMMUNICATION METHOD, DEVICE AND SYSTEM", the disclosures of which are herein incorporated by reference in their entireties.

TECHNICAL FIELD

The present disclosure relates to communications technologies, and in particular, to a communication method, device, and storage medium.

BACKGROUND

With the development of science and technology, vehicles (a type of node in a communication system) on roads are more and more, and traffic congestion often occurs on the roads.

In some embodiments, after a traffic accident occurs at a certain position on a certain lane, a user of a vehicle in the traffic accident places a warning sign at this position to warn vehicles behind to change lanes in time. However, due to distance and sight line obstruction, the vehicles behind cannot change lanes in time and are concentrated near the warning sign to change lanes. In this way, traffic congestion is prone to forming in the case that the traffic flow is large.

Therefore, a method for alleviating traffic congestion is needed.

SUMMARY

The present disclosure provides a communication method, device, and storage medium. The technical solutions are as follows:

According to some embodiments of the present disclosure, a communication method is provided. The method is performed by a first node, and the method includes:

acquiring to-be-transmitted target data;

acquiring information of parsing conditions required to be satisfied by a node for parsing the target data, wherein the parsing conditions include that a distance between a position of the node for parsing the target data and an initial position is less than or equal to a target distance; the initial position being a position of the first node or an occurrence position of a target event, and the target data indicating the target event; and sending a target message including the information of the parsing conditions and the target data.

In some embodiments, the method satisfies any one of the following conditions:

the information of the parsing conditions includes the initial position and the target distance; or the information of the parsing conditions includes the target distance in a case where the initial position is the position of the first node.

In some embodiments, the method satisfies at least one of the following conditions:

the parsing conditions include the node for parsing the target data is disposed at a target orientation of the first node, and the information of the parsing conditions includes the position of the first node and the target orientation;

the parsing conditions further include a moving direction of the node for parsing the target data is a target moving direction, and the information of the parsing conditions includes the target moving direction;

the parsing conditions further include a frequency of receiving the target data by the node for parsing the target data is less than a frequency threshold, and the information of the parsing conditions includes an identifier of the target message; or the parsing conditions further include an identifier of the node for parsing the target data belonging to a node identifier set, and the information of the parsing conditions includes the node identifier set.

In some embodiments, the target message includes a first sub-message and a second sub-message, the first sub-message includes the information of the parsing conditions, and the second sub-message includes the target data; and sending the target message including the information of the parsing conditions and the target data includes:

sending the first sub-message and the second sub-message sequentially.

In some embodiments, the method further includes:

sending the target message repeatedly.

In some embodiments, the method further includes:

acquiring a sending period for the target message and a sending deadline for the target message;

sending the target message repeatedly includes:

sending the target message repeatedly based on the sending period prior to the sending deadline; and the target message further includes the sending period and the sending deadline.

According to some embodiments of the present disclosure, a communication method is provided. The method is performed by a second node, and the method includes:

receiving information of parsing conditions in a target message, wherein the target message further includes target data, and the parsing conditions include that a distance between a position of a node for parsing the target data and an initial position is less than or equal to a target distance, the initial position being a position of a first node, or an occurrence position of a target event, and the target data indicating the target event;

judging whether the second node satisfies the parsing conditions or not based on the information of the parsing conditions; and parsing the target data as received in a case where the second node satisfies the parsing conditions.

In some embodiments, the initial position is the position of the first node, and the information of the parsing conditions includes a preset distance; and judging whether the second node satisfies the parsing conditions or not based on the information of the parsing conditions includes:

determining whether a distance between a position of the second node and a position of a node for sending the information of the parsing conditions is less than or equal to the preset distance in the information of the parsing conditions based on a time of flight (TOF) method; and determining that a distance between the position of the second node and the initial position is less than or equal to the target distance in a case where the distance between the position of the second node and the position of the node for sending the information of the parsing conditions is less than or equal to the preset distance in the information of the parsing conditions.

In some embodiments, the target message includes a first sub-message and a second sub-message sent by the first node in sequence, the first sub-message includes the information of the parsing conditions, and the second sub-message includes the target data;

receiving the information of the parsing conditions in the target message includes:

receiving the first sub-message;

the method further includes:

receiving the second sub-message in a case where the second node satisfies the parsing conditions; and parsing the target data as received includes:

parsing the target data in the second sub-message.

In some embodiments, after receiving the information of the parsing conditions in the target message, the method further includes:

receiving the target data in the target message sent by the first node.

In some embodiments, the method further includes:

forwarding the target message in a case where a distance between a position of the second node and the initial position is less than the target distance.

In some embodiments, the initial position is the position of the first node, and the information of the parsing conditions includes a preset distance; and judging whether the second node satisfies the parsing conditions or not based on the information of the parsing conditions includes:

determining whether a distance between a position of the second node and a position of the node for sending the information of the parsing conditions is less than or equal to the preset distance in the information of the parsing conditions based on the time of flight (TOF) method; and determining that the distance between the position of the second node and the initial position is less than or equal to the target distance in a case where the distance between the position of the second node and the position of the node for sending the information of the parsing conditions is less than or equal to the preset distance in the information of the parsing conditions; and prior to forwarding the target message, the method further includes:

modifying the preset distance in the information of the parsing conditions, wherein a difference between the preset distance in the information of the parsing conditions prior to modification and the preset distance in the information of the parsing conditions after modification is equal to a distance between the position of the second node and the position of the first node.

In some embodiments, the target message further includes a sending period for the target message, and a sending deadline for the target message, and forwarding the target message includes:

forwarding the target message periodically based on the sending period prior to the sending deadline.

According to some embodiments of the present disclosure, a communication device is provided. The communication device includes a processor and a memory having programs stored herein, wherein the processor, when running the programs stored in the memory, is caused to perform the communication method according to any one of the above embodiments.

According to some embodiments of the present disclosure, a non-transitory computer-readable storage medium having instructions stored therein is provided. The instructions, when executed on a computer, cause the computer to perform the communication method according to any one of the above embodiments.

DETAILED DESCRIPTION

For clearer descriptions of the principle, technical solutions, and advantages of the present disclosure, the embodiments of the present disclosure are further described in detail below with reference to the drawings.

Figure 1:
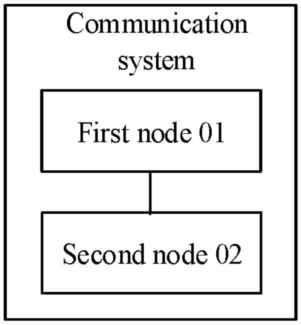
FIG. 1 is a schematic structural diagram of a communication system according to some embodiments of the present disclosure.

Embodiments of the present disclosure provide a communication system. As shown in FIG. 1, the communication system includes a first node 01 and a second node 02. It should be noted that the communication system includes a plurality of nodes, the first node 01 and the second node 02 are any two nodes, and the quantity of the nodes in the communication system is further greater than 2, which is not limited in the embodiments of the present disclosure. The nodes in the communication system are any apparatuses having a communication function, such as a vehicle, a mobile phone, a computer, or a server.

The first node 01 and the second node 02 can communicate, in some embodiments, the first node 01 and the second node 02 communicate via a wireless network or a wired network. The wireless network includes, but is not limited to wireless fidelity (WIFI for short), bluetooth, infrared, Zigbee, data, and the like.

Based on the communication system provided by the embodiments of the present disclosure, embodiments of the present disclosure provide the following communication methods.

Figure 2:
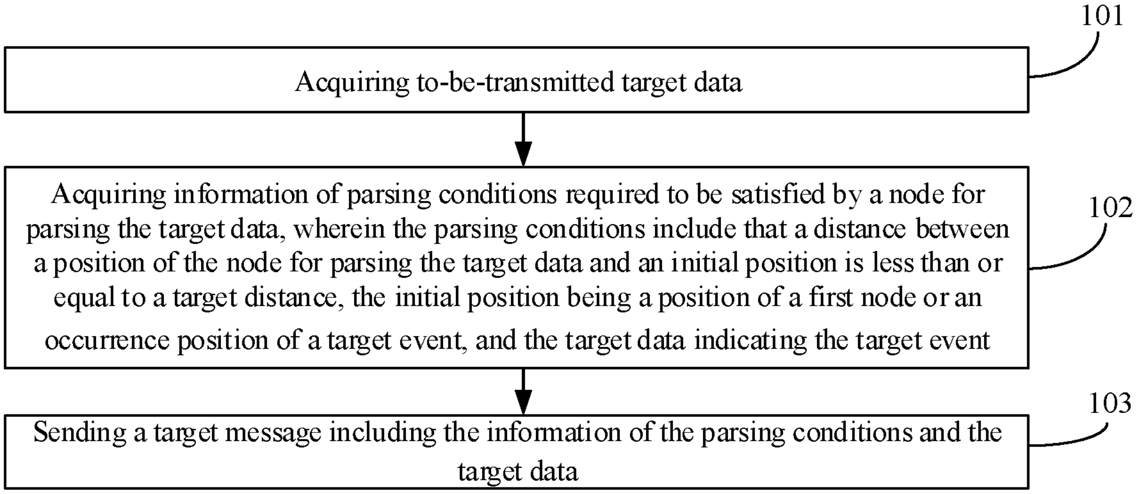
FIG. 2 is a flowchart of a communication method according to some embodiments of the present disclosure.

In some embodiments, FIG. 2 is a flowchart of a communication method performed by a first node according to some embodiments of the present disclosure. As shown in FIG. 2, the method includes:

In step 101, to-be-transmitted target data is acquired.

In step 102, information of parsing conditions required to be satisfied by a node for parsing the target data is acquired, where the parsing conditions include a distance between a position of the node for parsing the target data and an initial position is less than or equal to a target distance; the initial position being a position of the first node or an occurrence position of a target event, and the target data indicating the target event.

In step 103, a target message including the information of the parsing conditions and the target data is sent.

In summary, according to the communication method provided in the embodiments of the present disclosure, as the target message sent by the first node includes the information of the parsing conditions, which are related to the distance between the nodes, such that the first node designates the nodes within the target distance to receive and parse the target data, and thus the nodes within the target distance are notified of the target event. In the case that the nodes are vehicles and the target event is related to traffic congestion, the notification related to the traffic congestion is carried out on the vehicles within the target distance, to relieve the traffic congestion.

Figure 3:
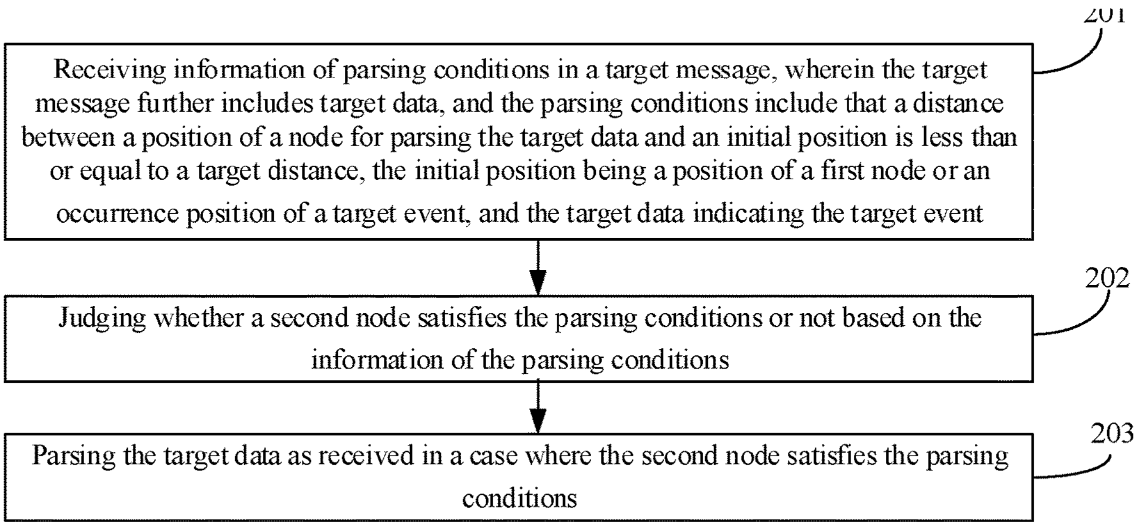
FIG. 3 is a flowchart of another communication method according to some embodiments of the present disclosure.

In some embodiments, FIG. 3 is a flowchart of a communication method performed by a second node according to some embodiments of the present disclosure. As shown in FIG. 3, the method includes:

In step 201, information of parsing conditions in a target message is received, where the target message further includes target data; the parsing conditions include a distance between a position of a node for parsing the target data and an initial position is less than or equal to a target distance; the initial position being a position of a first node or an occurrence position of a target event, and the target data indicating the target event.

In step 202, whether the second node satisfies the parsing conditions or not is judged based on the information of the parsing conditions.

In step 203, the target data as received is parsed in the case that the second node satisfies the parsing conditions.

In summary, according to the communication method provided in the embodiments of the present disclosure, as the target message sent by the first node includes the information of the parsing conditions, which are related to the distance between the nodes, such that the first node designates the nodes within the target distance to receive and parse the target data, and thus the nodes within the target distance are notified of the target event. In the case that the nodes are vehicles and the target event is related to traffic congestion, the notification related to the traffic congestion is carried out on the vehicles within the target distance, to relieve the traffic congestion.

Figure 4:
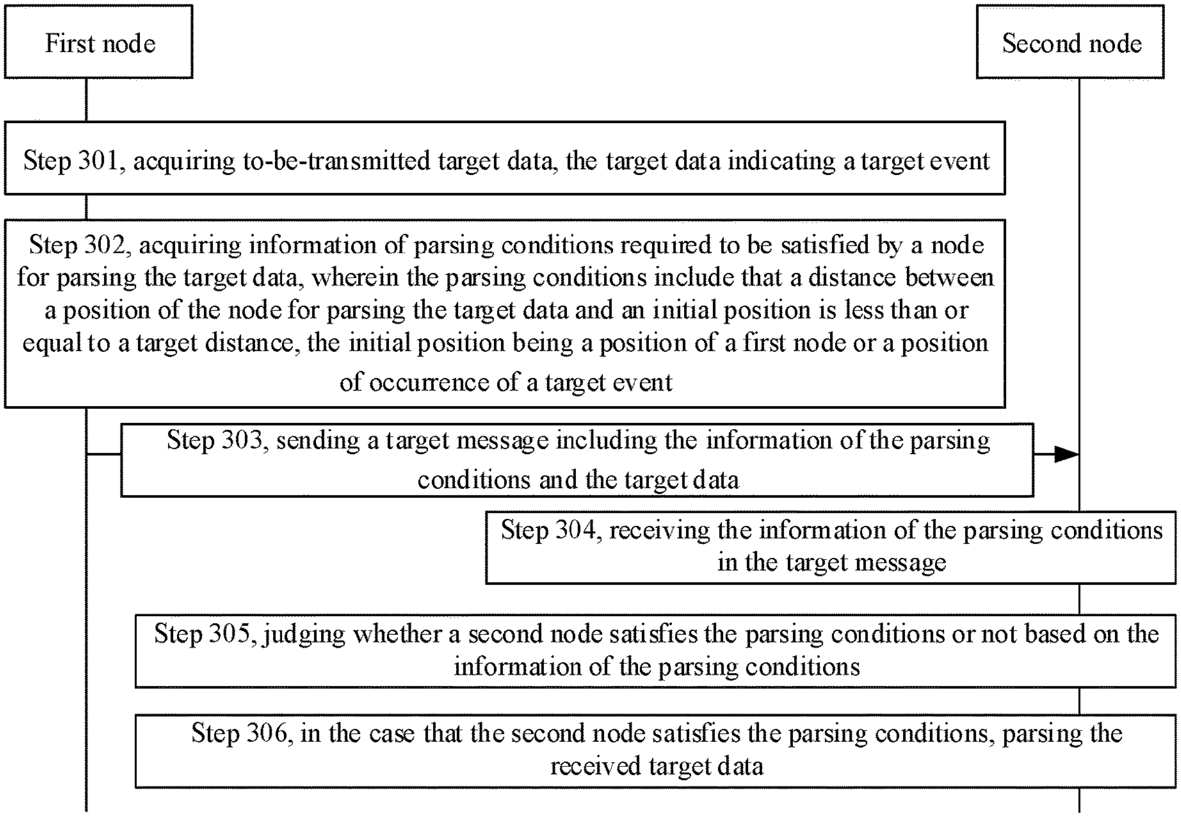
FIG. 4 is a flowchart of another communication method according to some embodiments of the present disclosure.

In some embodiments, FIG. 4 is a flowchart of a communication method applicable to the communication system shown in FIG. 1 according to some embodiments of the present disclosure. As shown in FIG. 4, the method includes:

In step 301, a first node acquires to-be-transmitted target data, and the target data indicates a target event.

The target data is data required to be transmitted to other nodes by the first node. The data type is not limited in the embodiments of the present disclosure, in some embodiments, the data include at least one of text, picture and video.

The target data indicates the target event, and transmission of the target data by the first node to the other nodes enables the other nodes to be notified of the target event.

In step 301, the first node receives target data input by a user, or the first node generates target data, or the first node receives target data sent by other nodes, and the embodiments of the present disclosure do not limit a manner for the first node to acquire the target data.

In step 302, the first node acquires information of parsing conditions required to be satisfied by a node for parsing the target data, where the parsing conditions include a distance between a position of the node for parsing the target data and an initial position is less than or equal to a target distance, the initial position being a position of the first node or an occurrence position of the target event.

The target data acquired by the first node are not parsed by each node, but parsed by nodes satisfying the parsing conditions. In step 302, the first node acquires the information of the parsing conditions.

In the embodiments of the present disclosure, the parsing conditions include the distance between the position of the node for parsing the target data and the initial position is less than or equal to the target distance; and the initial position is the position of the first node or the occurrence position of the target event.

Figure 5:
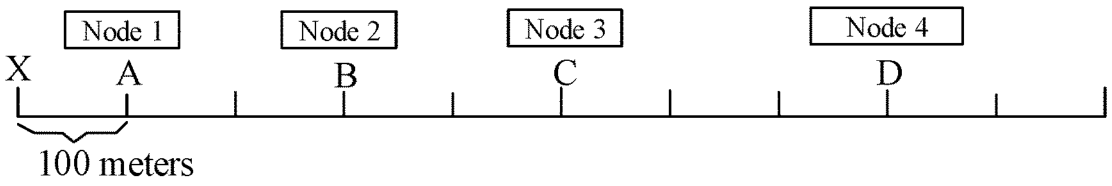
FIG. 5 is a schematic diagram of a node position according to some embodiments of the present disclosure.

Referring to FIG. 5, assuming that the occurrence position of the target event is X, the position of a node 1 is A, the position of a node 2 is B, the position of a node 3 is C, and the position of a node 4 is D; and the distances between the various positions X, A, B, C, and D are shown in FIG. 5, the node 1 is the first node, and the target distance is 500 meters.

In the case that the initial position is position A of the node 1, the distance between position B of the node 2 and position A of the node 1 is 200 meters (less than 500 meters), the distance between position C of the node 3 and position A of the node 1 is 400 meters (less than 500 meters), and the distance between position D of the node 4 and position A of the node 1 is 700 meters (greater than 500 meters). It can be seen that the nodes 2 and 3 both satisfy the parsing conditions, but the node 4 does not satisfy the parsing conditions.

In the case that the initial position is occurrence position X of the target event, the distance between position B of the node 2 and position X is 300 meters (less than 500 meters), the distance between position C of the node 3 and position X is 500 meters (equal to 500 meters), and the distance between position D of the node 4 and position X is 800 meters (greater than 500 meters). It can be seen that the nodes 2 and 3 both satisfy the parsing conditions, but the node 4 does not satisfy the parsing conditions.

In the case that the parsing conditions include that the distance between the position of the node for parsing the target data and the initial position is less than or equal to the target distance, the information of the parsing conditions has a plurality of implementation manners.

In an implementation manner of the information of the parsing conditions, the information of the parsing conditions includes the initial position and the target distance, and a node with the information of the parsing conditions received determines the above parsing conditions based on the initial position and the target distance. The node with the information of the parsing conditions received further determines whether the node satisfies the parsing conditions based on its own position, the initial position in the information of the parsing conditions, and the target distance.

In another implementation manner of the information of the parsing conditions, in the case that the initial position is the position of the first node, the information of the parsing conditions includes a preset distance (e.g., the target distance). At this time, the information of the parsing conditions does not necessarily include the initial position. Moreover, the node with the information of the parsing conditions received determines that a distance between a position of a second node and the initial position is less than or equal to the target distance based on other methods (e.g., a Time of flight (TOF) method).

How the node with the information of the parsing conditions received determines whether the node satisfies the parsing conditions is introduced in the subsequent steps, which is not described herein again.

In some embodiments, in the case that the information of the parsing conditions includes the target distance, the first node receives the target distance input by the user, or the first node generates the target distance by itself (e.g., parse the information of the target event based on a machine learning model, and output the target distance). In the case that the information of the parsing conditions includes the initial position, the first node acquires the initial position based on a Global Positioning System (GPS).

In some embodiments, the first node is periodically positioned based on a GPS positioning manner, and in the case that the initial position is the position of the first node and the first node acquires the information of the parsing conditions, the latest positioning result is determined as the position of the first node in the information of the parsing conditions.

In step 303, the first node sends a target message including the information of the parsing conditions and the target data to the second node.

After the first node acquires the information of the parsing conditions and the target data, the first node encapsulates the target message in a format of the target message based on the information of the parsing conditions and the target data, and then sends the target message to the second node.

The manner in which the first node sends the target message to the second node is varied. For example, the first node establishes a communication connection with the second node and then sends the target message to the second node based on the communication connection. In some embodiments, the first node broadcasts the target message, and the target message broadcast by the first node is received by at least one node, including the second node, such that the first node sends the target message to the second node.

In some embodiments, the target message is one message or a plurality of messages.

In the case that the target message is one message, the information of the parsing conditions in the target message is sent prior to the target data. That is, in the case that the first node sends the target data, the first node sends the information of the parsing conditions in the target message firstly, and then sends the target data in the target message.

In the case that the target message includes the plurality of messages, the target message includes a first sub-message and a second sub-message, the first sub-message includes the information of the parsing conditions, and the second sub-message includes target data. In other words, the target message includes two sub-messages including the information of the parsing conditions and the target data respectively. In the case that the first node sends the target message, the first node sequentially sends the first sub-message and the second sub-message.

In some embodiments, the target data in the target message are encrypted target data, such that the transmission security of the target data is ensured.

In the case that the first node sends the target message, the first node sends the target message based on a radio frequency technology, a wireless technology, and the like. For example, the first node sends the target message based on machine-to-machine (M2M) or multiple-in-multiple-out (MIMO) technologies.

In step 304, the second node receives the information of the parsing conditions in the target message.

The second node receives the information of the parsing conditions in a manner in which the first node sends the information of the parsing conditions in the target message. In some embodiments, in the case that the target message is one message, the second node receives the information of the parsing conditions (disposed in a header of the target message) transmitted firstly in the target message. In some embodiments, in the case that the target message includes the first sub-message and the second sub-message, the second node receives the first sub-message in step 304 to receive the information of the parsing conditions in the target message.

In step 305, the second node judges whether the second node satisfies the parsing conditions or not based on the information of the parsing conditions.

After receiving the information of the parsing conditions, the second node parses the information of the parsing conditions to determine the parsing conditions, and then judges whether the second node satisfies the parsing conditions.

In the embodiments of the present disclosure, the parsing conditions include the distance between the position of the node for parsing the target data and the initial position is less than or equal to the target distance. In the case that the distance between the position of the second node and the initial position is less than or equal to the target distance, it is judged that the second node satisfies the parsing conditions; and in the case that the distance between the position of the second node and the initial position is greater than the target distance, it is judged that the second node does not satisfy the parsing conditions.

In some embodiments, in the case that the information of the parsing conditions includes the initial position and the target distance, the second node determines the position of the second node based on the GPS positioning manner, and then determines whether the second node satisfies the parsing conditions according to the position of the second node, the initial position and the target distance. In some embodiments, the second node is periodically positioned based on the GPS positioning manner, and in the case that the position of the second node is determined, the latest positioning result is determined as the position of the second node.

In some embodiments, in the case that the information of the parsing conditions does not include the initial position and includes the distance (e.g., the target distance), and the initial position is the position of the first node, and in the case that the second node judges whether the second node satisfies the parsing conditions or not based on the information of the parsing conditions, the distance between the position of the second node and the position of the node (e.g., the first node) sending the information of the parsing conditions is determined based on a TOF method according to the target distance. In the case that the distance between the position of the second node and the position of the node for sending the information of the parsing conditions is less than or equal to the preset distance in the information of the parsing conditions, the second node determines that the distance between the position of the second node and the initial position is less than or equal to the target distance.

In some embodiments, continuing to refer to FIG. 5, assuming that the first node is the node 1 at position A and the second node is the node 2 at position B, in the case that the initial position is position A of the node 1 and the target distance is 500 meters, after the node 2 receives the information of the parsing conditions, it is determined that the distance (200 meters) between position B of the node 2 and position A of the node 1 is less than 500 meters, and the node 2 satisfies the parsing conditions.

In some embodiments, continuing to refer to FIG. 5, assuming that the first node is the node 1 at position A and the second node is the node 4 at position D, in the case that the initial position is position A of the node 1 and the target distance is 500 meters, after the node 4 receives the information of the parsing conditions, it is determined that the distance (700 meters) between position D of the node 4 and position A of the node 1 is greater than 500 meters, and the node 4 does not satisfy the parsing conditions.

In step 306, in the case that the second node satisfies the parsing conditions, the second node parses the target data as received.

In the case that the second node satisfies the parsing conditions, the second node parses the received target data to determine the target event indicated by the target data. In the case that the second node does not satisfy the parsing conditions, the second node ignores the target message and does not parse the target data.

Further, the second node needs to receive the target data prior to parsing the target data.

In some embodiments, in the case that the target message is one message, the first node sends the target data including both the information of the parsing conditions and the target data, and sends the information of the parsing conditions prior to the target data. At this time, the second node receives the target data in the target message after step 304.

In some embodiments, in the case that the target message includes the first sub-message and the second sub-message, after step 304, the second node receives the second sub-message in the case that it is determined that the second node satisfies the parsing conditions, so as to receive the target data in the target message. In this way, the power consumption waste caused by receiving the second sub-message in the case that the second node does not satisfy the parsing conditions is avoided.

In some embodiments, in the case that the target message includes the first sub-message and the second sub-message, after step 304, the second node receives the second sub-message including the target data firstly, and then judges whether the second node satisfies the parsing conditions.

In some embodiments, the target data in the target message are encrypted target data, and at this time, the second node further decrypts the encrypted target data prior to parsing the target data.

The second node further displays the target data after parsing the target data. In some embodiments, the second node includes a display component (e.g., a display screen), and the second node displays the target data through the display component. In some embodiments, the second node includes a loudspeaker, and the second node plays the target data through the loudspeaker.

In summary, according to the communication method provided in the embodiments of the present disclosure, as the target message sent by the first node includes the information of the parsing conditions, which are related to the distance between the nodes, such that the first node designates the nodes within the target distance to receive and parse the target data, and thus the nodes within the target distance are notified of the target event. In the case that the nodes are vehicles and the target event is related to traffic congestion, the notification related to the traffic congestion is carried out on the vehicles within the target distance, to relieve the traffic congestion.

Further, the above embodiments take the parsing conditions including the distance between the position of the node for parsing the target data and the initial position is less than or equal to the target distance as an example. In some embodiments, the parsing conditions further include at least one of the following conditions (1) to (4).

Condition (1): the node for parsing the target data is disposed at a target orientation of the first node.

In the case that the parsing conditions further include Condition (1), the parsing conditions are related to an orientation of the node for parsing the target data relative to the first node, such that the node for parsing the target data is further limited.

In some embodiments, assuming that the target orientation is the true north orientation of the first node, and the node is a vehicle, in the case that the true north direction of the first node is opposite to a driving direction of the first node on a lane, the target data are transmitted to vehicles behind the first node. It should be noted that, in the case that the target event is a traffic accident on the lane where the first node runs, the traffic accident affects the normal driving of the vehicles running after the first node, such that transmission of the target data to the vehicles behind the first node notifies the traffic accident to the vehicles, to reduce the influence of the traffic accident on the driving of the vehicles.

In the case that the parsing conditions include Condition (1), the information of the parsing conditions includes the position of the first node and the target orientation of the first node. The second node determines Condition (1) in the parsing conditions based on the position and the target orientation of the first node. Moreover, the second node further determines whether the second node is disposed at the target orientation of the first node or not based on the position of the second node and the position of the first node, to determine whether the second node satisfies Condition (1).

In some embodiments, in the case that the information of the parsing conditions includes the initial position and the position of the first node, and the initial position is the position of the first node, the initial position in the information of the parsing conditions is reused to indicate the position of the first node. In some embodiments, the initial position is not reused to indicate the position of the first node, which is not limited in the embodiments of the present disclosure.

Condition (2): a moving direction of the node for parsing the target data is a target moving direction.

In the case that the parsing conditions further include Condition (2), the parsing conditions are related to the moving direction of the node for parsing the target data, such that the node for parsing the target data is further limited.

In some embodiments, assuming that the target moving direction is the moving direction of the first node and the node is a vehicle, the target data are transmitted to the vehicles in the same moving direction as the first node. It should be noted that, in the case that the target event is a traffic accident on the lane where the first node runs, the traffic accident affects the normal driving of the vehicles on the lane where the first node runs, such that the target data are transmitted to the vehicles in the same driving direction as the first node (the vehicles running on the same lane as the first node), and the traffic accident is notified to the vehicles, to reduce the influence of the traffic accident on the driving of the vehicles.

In the case that the parsing conditions include Condition (2), the information of the parsing conditions includes the target moving direction. The second node determines Condition (2) in the parsing conditions based on the target moving direction. Moreover, the second node further acquires its own moving direction and determines whether its own moving direction is the target moving direction, to determine whether the second node satisfies Condition (2).

In some embodiments, the position of the second node is periodically determined based on the GPS positioning manner, and the moving direction of the second node is periodically determined based on the determined position. In the case that whether the second node satisfies Condition (2) is judged, the second node compares the newly determined moving direction with the target moving direction, to determine whether the second node satisfies Condition (2).

Condition (3): a frequency of receiving the target data by the node for parsing the target data is less than a frequency threshold.

In the case that the parsing conditions further include Condition (3), the parsing conditions are related to the frequency of receiving the target data by the node for parsing the target data, such that the node for parsing the target data is further limited.

In some embodiments, the frequency threshold is two, three, or the like, and in the case that the frequency threshold is two, the node that receives the target data for the first time parses the target data, but the node that receives the target data for the second time does not parse the target data, such that the nodes are prevented from repeatedly parsing the target data.

In the case that the parsing conditions include Condition (3), the information of the parsing conditions includes an identifier of the target message. The second node determines Condition (3) in the parsing conditions according to the identifier of the target message. Moreover, the second node further stores the identifier of the message received each time, determines the frequency of receiving the target data in the target message based on the identifier of the target message, and judges whether the frequency is less than the frequency threshold, to determine whether the second node satisfies Condition (3).

It should be noted that, in the case that the target message includes the first sub-message and the second sub-message, both the first sub-message and the second sub-message carry the identifier of the target message, and the first sub-message and the second sub-message are distinguished based on a message type.

Condition (4): an identity of the node for parsing the target data belongs to a node identifier set.

In the case that the parsing conditions further include Condition (4), the node for parsing the target data is further limited.

In some embodiments, the node identifier set includes an identifier of the node 2, and in the case that the node with the target data received is the node 3, as an identifier of the node 3 does not belong to the node identifier set, the node 3 does not parse the target data. In the case that the node with the target data received is the node 2, as the identifier of the node 2 belongs to the node identifier set, the node 2 parses the target data.

In the case that the parsing conditions include Condition (4), the information of the parsing conditions includes the node identifier set.

Further, in the above embodiments, the first node further repeatedly sends the target message after sending the target message, to improve transmission reliability of the target message.

In some embodiments, the first node acquires a sending period and a sending deadline for the target message prior to repeatedly sending the target message. In the case that the first node repeatedly sends the target message, the first node repeatedly sends the target message according to the sending period prior to the sending deadline. The sending period and the sending deadline for the target message are configured by a user of the first node on the first node, or generated by the first node, or sent to the first node by other nodes, which is not limited in the embodiments of the present disclosure.

The first node repeatedly sends the target message based on the sending period and the sending deadline, such that the target message is regularly sent within a certain period of time. Moreover, the target message is sent prior to the sending deadline, such that the target message has timeliness.

In addition, after the second node receives the target message, the second node further forwards the target message in the case that the distance between the position of the second node and the initial position is less than the target distance, such that the target message is received by more nodes, and the target data are parsed by more nodes satisfying the parsing conditions. In this way, even if transmission power of the first node is low and the target message sent by the first node cannot be received by a remote node, the second node forwards the target message, such that the probability that the target message is received by the remote node is improved.

In some embodiments, the target message further includes the sending period for the target message, and the sending deadline for the target message. At this time, in the case that the second node forwards the target message, the second node periodically forwards the target message based on the sending period prior to the sending deadline.

In some embodiments, in the case that the second node determines whether the distance between the position of the second node and the position of the first node is less than or equal to the target distance or not based on the TOF method, the second node further modifies the target distance in the target message prior to forwarding the target message. A difference between the preset distance in the information of the parsing conditions prior to modification and the preset distance in the information of the parsing conditions after modification is equal to a distance between the position of the second node and the position of the first node.

In some embodiments, still taking the example shown in FIG. 5 as an example, in the case that the node 1 at position A is the first node, and the target distance in the target message sent by the node 1 is 500 meters, it indicates that the node for parsing the target data needs to be 500 meters away from the initial position. In the case that the node 2 at position B determines that the node 2 is 200 meters away (less than 500 meters) from the node 1 based on the TOF method, the node 2 parses the target data. In the case that the second node forwards the target message, the node 2 needs to change the target distance from 500 meters to 500 meters−200 meters=300 meters. In the case that the node 3 at position C receives the target message forwarded by the node 2, it is determined that the node 3 is 200 meters (less than 300 meters) away from the node 2 based the TOF method, and then the node 3 parses the target data. In the case that the node 4 at position D receives the target message forwarded by the node 2, it is determined that the node 4 is 500 meters (not less than 300 meters) away from the node 2 based on the TOF method, and then the node 4 does not parse the target data.

In some embodiments, the first node does not repeatedly send the target message, and the second node repeatedly forwards the target message, in which case the target message still includes the sending period for the target message and the sending deadline for the target message.

The above embodiments take the second node receiving the target message sent by the first node as an example. In some embodiments, the second node further receives a target message forwarded by other nodes except the first node, which is not limited in the embodiments of the present disclosure. In some embodiments, in the case that the first node is the node 1 in FIG. 5, the nodes 2, 3, and 4 all receive the target message sent by the node 1, and at this time, the nodes 2, 3, and 4 are all the second nodes. The nodes 3 and 4 further receive the target message forwarded by the node 2, and the node 4 further receives the target message forwarded by the node 3.

Figure 6:
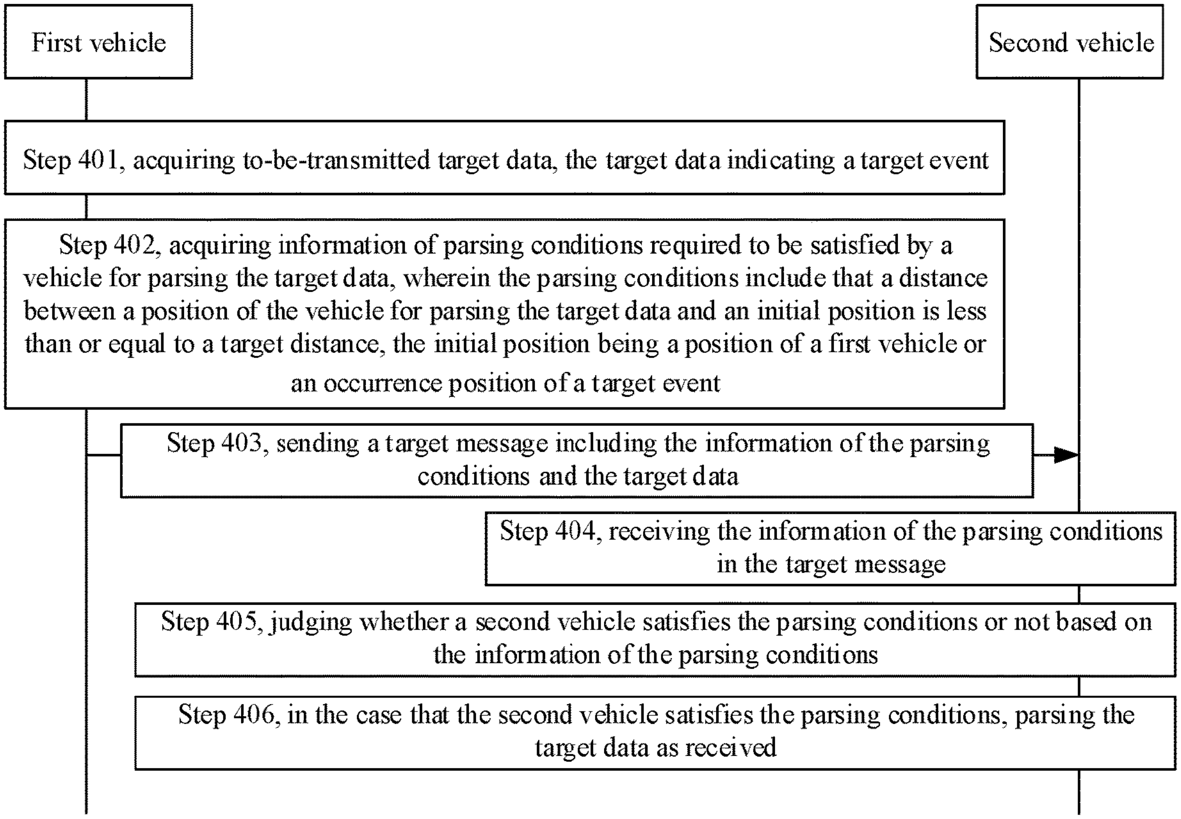
FIG. 6 is a flowchart of another communication method according to some embodiments of the present disclosure.

In some embodiments, FIG. 6 is a flowchart of a communication method applicable to the communication system shown in FIG. 1 according to some embodiments of the present disclosure. The method takes nodes in the communication system as vehicles, a first node referred to as a first vehicle, and a second node referred to as a second vehicle as an example. As shown in FIG. 6, the method includes the following steps.

In step 401, the first vehicle acquires to-be-transmitted target data, and the target data are defined to indicate a target event.

Step 401 refers to step 301, which is not described herein again in the embodiments of the present disclosure.

The target event is an event, such as a vehicle failure, the presence of an obstacle in a road, and a traffic accident.

The target data are implemented in a form of texts and pictures, in some embodiments, in the case that the target event is a traffic accident, the target data include the text: "the traffic accident occurs in lane 1, please merge into lane 2 to drive", and the target data further includes an image of the traffic accident.

The target data are data that a user of the first vehicle inputs the first vehicle in the case that a running speed of the first vehicle is low. In some embodiments, the first vehicle detects whether the running speed is less than a speed threshold before step 401, and prompts the user of the first vehicle to input the target data in the case that the running speed is less than the speed threshold.

In step 402, the first vehicle acquires information of parsing conditions required to be satisfied by a vehicle for parsing the target data, where the parsing conditions include a distance between a position of the vehicle for parsing the target data and an initial position is less than or equal to a target distance; and the initial position is a position of the first vehicle or an occurrence position of the target event.

Step 402 refers to step 302, which is not described herein again in the embodiments of the present disclosure.

In step 403, the first vehicle sends a target message including the information of the parsing conditions and the target data to the second vehicle.

Step 403 refers to step 303, which is not described herein again in the embodiments of the present disclosure.

In step 404, the second vehicle receives the information of the parsing conditions in the target message.

Step 404 refers to step 304, which is not described herein again in the embodiments of the present disclosure.

In step 405, the second vehicle judges whether the second vehicle satisfies the parsing conditions or not based on the information of the parsing conditions.

Step 405 refers to step 305, which is not described herein again in the embodiments of the present disclosure.

In step 406, in the case that the second vehicle satisfies the parsing conditions, the second vehicle parses the received target data.

Step 406 refers to step 306, which is not described herein again in the embodiments of the present disclosure.

The second vehicle further needs to receive the target data prior to parsing the target data.

In some embodiments, in the case that the target message is one message, the first vehicle sends the target data including both the information of the parsing conditions and the target data, and sends the information of the parsing conditions prior to the target data. At this time, the second vehicle receives the target data in the target message after step 404.

In some embodiments, in the case that the target message includes a first sub-message and a second sub-message, after step 404, the second vehicle receives the second sub-message in the case that it is determined that the second vehicle satisfies the parsing conditions, to receive the target data in the target message. In this way, the power consumption waste caused by receiving the second sub-message in the case that the second vehicle does not satisfy the parsing conditions is avoided.

In some embodiments, in the case that the target message includes the first sub-message and the second sub-message, after step 404, the second vehicle receives the second sub-message including the target data firstly, and then judges whether the second vehicle satisfies the parsing conditions.

In summary, according to the communication method provided in the embodiments of the present disclosure, as the target message sent by the first node includes the information of the parsing conditions, which are related to the distance between the nodes, such that the first node designates the nodes within the target distance to receive and parse the target data, and thus the nodes within the target distance are notified of the target event. In the case that the nodes are vehicles and the target event is related to traffic congestion, the notification related to the traffic congestion is carried out on the vehicles within the target distance, to relieve the traffic congestion.

Further, the above embodiments take the parsing conditions including the distance between the position of the vehicle for parsing the target data and the initial position is less than or equal to the target distance as an example. In some embodiments, the parsing conditions further include at least one of the following conditions.

Condition (1): the vehicle for parsing the target data is disposed at a target orientation of the first vehicle. In the case that the parsing conditions include Condition (1), the information of the parsing conditions includes the position of the first vehicle and the target orientation of the first vehicle.

Condition (2): a moving direction of the vehicle for parsing the target data is a target moving direction. In the case that the parsing conditions include Condition (2), the information of the parsing conditions includes the target moving direction.

Condition (3): a frequency of receiving the target data by the vehicle for parsing the target data is less than a frequency threshold. In the case that the parsing conditions include Condition (3), the information of the parsing conditions includes an identifier of the target message.

Condition (4): an identity of the vehicle for parsing the target data belongs to a vehicle identifier set. In the case that the parsing conditions include Condition (4), the information of the parsing conditions includes the vehicle identifier set.

Further, in the above embodiments, the first vehicle further repeatedly sends the target message after sending the target message, to improve transmission reliability of the target message.

In some embodiments, the first vehicle acquires a sending period and a sending deadline for the target message prior to repeatedly sending the target message. In the case that the first vehicle repeatedly sends the target message, the first vehicle repeatedly sends the target message according to the sending period prior to the sending deadline.

In addition, after the second vehicle receives the target message, the second vehicle further forwards the target message in the case that the distance between the position of the second vehicle and the initial position is less than the target distance.

In some embodiments, the target message further includes the sending period for the target message, and the sending deadline for the target message. At this time, in the case that the second vehicle forwards the target message, the second vehicle periodically forwards the target message according to the sending period prior to the sending deadline.

In some embodiments, in the case that the second vehicle determines whether the distance between the position of the second vehicle and the position of the first vehicle is less than or equal to the target distance or not based on a TOF method, the second vehicle further modifies the target distance in the target message prior to forwarding the target message. A difference between the preset distance in the information of the parsing conditions prior to modification and the preset distance in the information of the parsing conditions after modification is equal to a distance between the position of the second vehicle and the position of the first vehicle.

The method provided by the embodiments of the present disclosure is illustrated by an example.

Figure 7:
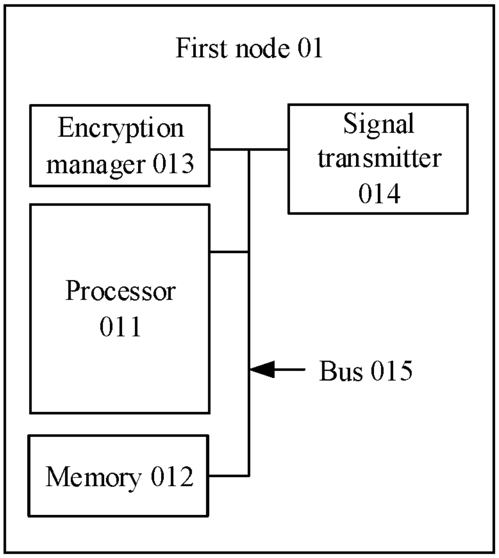
FIG. 7 is a schematic structural diagram of a first node according to some embodiments of the present disclosure.
Figure 8:
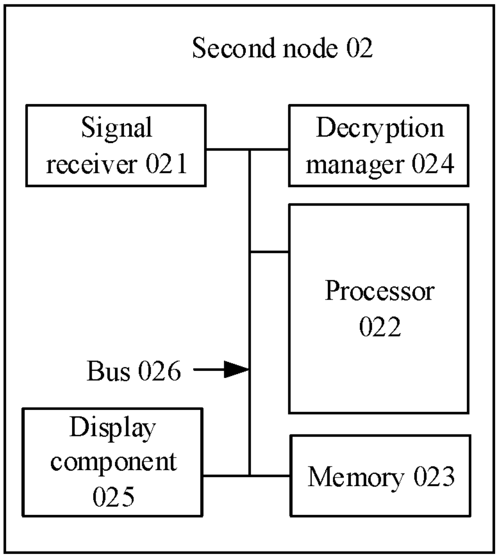
FIG. 8 is a schematic structural diagram of a second node according to some embodiments of the present disclosure.

In some embodiments, the structure of a first node 01 is as shown in FIG. 7, and the structure of a second node 02 is as shown in FIG. 8.

The first node 01 includes a processor 011, a memory 012, an encryption manager 013, a signal transmitter 014, and a bus 015, and the processor 011, the memory 012, the encryption manager 013, and the signal transmitter 014 are connected through the bus 015.

The second node 02 includes: a signal receiver 021, a processor 022, a memory 023, a decryption manager 024, a display component 025, and a bus 026, and the signal receiver 021, the processor 022, the memory 023, the decryption manager 024, and the display component 025 are connected through the bus 026.

The processors 011 and 022 are any device having a processing function, such as a central processing unit (CPU) or a microcontroller unit (MCU).

Programs are stored in the memory 012 and the memory 023. The processor 011 is configured to run the programs stored in the memory 012, and the processor 022 is configured to run the programs stored in the memory 023.

The signal transmitter 014 and the signal receiver 021 are devices based on a radio frequency technology, or devices based on other technologies (e.g., a wireless technology), which is not limited by the embodiments of the present disclosure.

In some embodiments, the first node 01 and the second node 02 further include positioners (not shown in FIGS. 7 and 8), configured to position the nodes.

Figure 9:
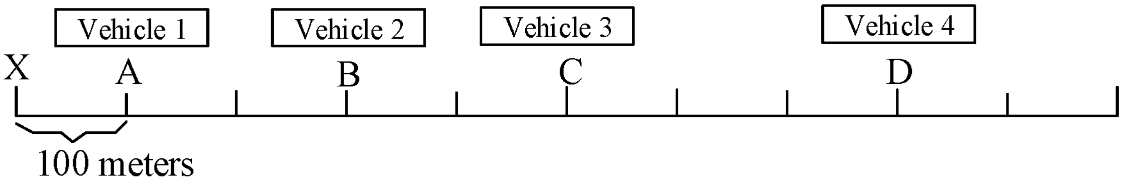
FIG. 9 is a schematic diagram of vehicle positions according to some embodiments of the present disclosure.

As shown in FIG. 9, assuming that a communication system includes vehicles 1, 2, 3, and 4 running on the same lane, the vehicle 1 is disposed at position A, the vehicle 2 is disposed at position B, the vehicle 3 is disposed at position C, the vehicle 4 is disposed at position D, and a target event occurs at position X.

Each vehicle periodically acquires the position and moving direction of the vehicle during running.

The vehicle 1 receives target data input by a user during running, as well as condition parameters. The target data includes a text of "left 1 lane blocked" and a picture of the target event. A condition indication is an indication of parsing conditions, and the condition indication includes an indication of a target moving direction (e.g., defined to indicate that the target moving direction is a moving direction of the vehicle 1), an indication of a target orientation (defined to indicate that the target orientation is the rear of the vehicle 1), and an indication of a target distance (defined to indicate that the target distance is 500 meters). After that, the encryption manager 013 in the vehicle 1 encrypts the target data. The processor 011 in the vehicle 1 acquires the position and the moving direction of the vehicle 1 newly acquired by the vehicle 1, forms a template of condition information based on the position and the moving direction, and modifies the template of the condition information according to the condition parameters to acquire information of the parsing conditions. The processor 011 further encapsulates a target message in a format of the target message based on the encrypted target data and the information of the parsing conditions. Finally, the processor 011 sends the target message to the signal transmitter 014, and the target message is sent by the signal transmitter 014.

In some embodiments, the structure of the target message is as shown in table 1, the target message includes 16 protocol fields, and the 16 protocol fields are arranged in sequence in a time domain, such that contents of the 16 protocol fields are sent by the first node in sequence.

The content of the protocol field 1 is an identifier (ID) of the target message.

The content of the protocol field 2 is a total data volume of the target message.

The content of the protocol field 3 is a sender identifier (e.g., an identifier of the first node).

The content of the protocol field 4 is a node identifier set.

The content of the protocol field 5 is a type of the target message.

The content of the protocol field 6 is an importance level of the target message.

The content of the protocol field 7 is a moving direction of the first node.

The content of the protocol field 8 an initial position (e.g., a position of the first node).

The content of the protocol field 9 is a moving direction of a node for parsing the target data.

The content of the protocol field 10 is an orientation of the node for parsing the target data relative to the first node.

The content of the protocol field 11 is a target distance.

The content of the protocol field 12 is a sending deadline.

The content of the protocol field 13 is a sending period.

The content of the protocol field 14 is a type of the target data.

The content of the protocol field 15 is the target data.

The content of the protocol field 16 is check codes of the contents of the protocol fields 1 to 15.

TABLE 1

| Protocol Field | Content of Protocol Field |
|---|---|
| 1 | Identifier of target message |
| 2 | Total data volume of target message |
| 3 | Sender identifier |
| 4 | Node identifier set |
| 5 | Type of target message |
| 6 | Importance level of a target message |
| 7 | Moving direction of first node |
| 8 | Initial position |
| 9 | Moving direction of node for parsing target data |
| 10 | Orientation of node for parsing target data relative to first node |
| 11 | Target distance |
| 12 | Sending deadline |
| 13 | Sending period |
| 14 | Type of target data |
| 15 | Target data |
| 16 | Check codes of contents of protocol fields 1 to 15 |

In the target message, the target data are disposed in the protocol field 15, and the information of the parsing conditions includes the contents of the protocol fields 1, 4, 7, 8, 9, 10, and 11. At this time, the parsing conditions include:

a distance between the position of the node for parsing the target data and the initial position is less than or equal to the target distance;

the node for parsing the target data is disposed at the target orientation of the first node;

the moving direction of the node for parsing the target data is the target moving direction (the moving direction of the first node);

a frequency of receiving the target data by the node for parsing the target data is less than a frequency threshold; and the identifier of the node for parsing the target data belongs to the node identifier set.

The vehicles 2, 3, and 4 are all second nodes, and taking the vehicle 2 as an example, the signal receiver 021 in the vehicle 2 receives the information of the parsing conditions in the target message, and the processor 022 determines whether the vehicle 2 satisfies the parsing conditions according to the information of the parsing conditions. In the case that the vehicle 2 satisfies the parsing conditions, the processor 022 parses the target data of the target message, and decrypts the parsed target data through the decryption manager 024. The processor then forwards the decrypted target data to the display component 025 for display. In some embodiments, the processor 022 further checks the contents of the protocol fields 1 to 15 according to the check codes in the protocol field 16 of the target message prior to decrypting the parsed target data through the decryption manager 024. In addition, in the case that the vehicle 2 does not satisfy the parsing conditions, the vehicle 2 ignores the target message.

Further, the vehicle 1 further periodically sends the target message based on the sending deadline in the protocol 12 and the sending period in the protocol 13 prior to the sending deadline. The vehicle 2 further periodically forwards the target message (e.g., forward the target message to the vehicle 3) based on the sending deadline and the sending period. In the case that the vehicle 2 forwards the target message, the sender identifier in the protocol field 3 is changed from the identifier of the vehicle 1 to the identifier of the vehicle 2.

It should be noted that, the above embodiments take the first node sending the target message to the second node as an example. In some embodiments, the second node sends the target message to the first node, at this time, the first node has the above-mentioned function of the second node, and the second node has the above-mentioned function of the first node.

Figure 10:
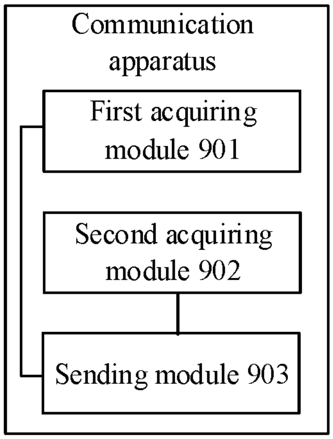
FIG. 10 is a block diagram of a communication apparatus according to some embodiments of the present disclosure.

Embodiments of the present disclosure further provide a communication apparatus, and the communication apparatus is a first node in the communication system provided by the embodiments of the present disclosure. As shown in FIG. 10, the communication apparatus includes:

a first acquiring module 901, configured to acquire to-be-transmitted target data;

a second acquiring module 902, configured to acquire information of parsing conditions required to be satisfied by a node for parsing the target data, wherein the parsing conditions includes that a distance between a position of the node for parsing the target data and an initial position is less than or equal to a target distance, the initial position being a position of the first node or an occurrence position of a target event, and the target data indicating the target event; and a sending module 903, configured to send a target message including the information of the parsing conditions and the target data.

In some embodiments, the communication apparatus satisfies any one of the following conditions:

the information of the parsing conditions includes the initial position and the target distance; or the information of the parsing conditions includes the target distance in a case where the initial position is the position of the first node.

In some embodiments, the communication apparatus satisfies at least one of the following conditions:

the parsing conditions further include the node for parsing the target data is disposed at a target orientation of the first node, and the information of the parsing conditions includes the position of the first node and the target orientation of the first node;

the parsing conditions further include a moving direction of the node for parsing the target data is a target moving direction, and the information of the parsing conditions includes the target moving direction;

the parsing conditions further include: a frequency of receiving the target data by the node for parsing the target data is less than a frequency threshold, and the information of the parsing conditions includes: an identifier of the target message; or the parsing conditions further include an identifier of the node for parsing the target data belongs to a node identifier set, and the information of the parsing conditions includes the node identifier set.

In some embodiments, the target message includes a first sub-message and a second sub-message, the first sub-message includes the information of the parsing conditions, and the second sub-message includes the target data; and the sending module 903 is configured to send the first sub-message and the second sub-message sequentially.

In some embodiments, the communication apparatus further includes a repeating module (not shown in FIG. 10), configured to repeatedly send the target message.

In some embodiments, the communication apparatus further includes: a third acquiring module (not shown in FIG. 10), configured to acquire a sending period for the target message and a sending deadline for the target message; the repeating module is configured to repeatedly send the target message based on the sending period prior to the sending deadline; and the target message further includes the sending period and the sending deadline.

In summary, according to the communication apparatus provided in the embodiments of the present disclosure, as the target message sent by the sending module includes the information of the parsing conditions, which are related to the distance between the nodes, such that the first node designates the nodes within the target distance to receive and parse the target data, and thus the nodes within the target distance are notified of the target event. In the case that the nodes are vehicles and the target event is related to traffic congestion, the notification related to the traffic congestion is carried out on the vehicles within the target distance, to relieve the traffic congestion.

Figure 11:
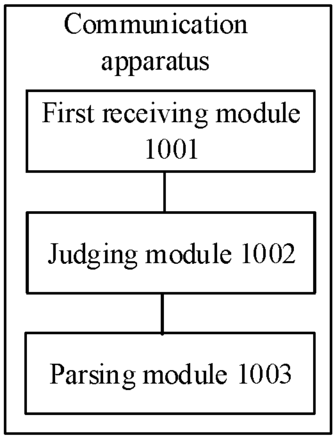
FIG. 11 is a block diagram of another communication apparatus according to some embodiments of the present disclosure.

Embodiments of the present disclosure further provide another communication apparatus, and the communication apparatus is a second node in the communication system provided by the embodiments of the present disclosure. As shown in FIG. 11, the communication apparatus includes:

a first receiving module 1001, configured to receive information of parsing conditions in a target message, wherein the target message further includes target data, and the parsing conditions include that a distance between a position of a node for parsing the target data and an initial position is less than or equal to a target distance; the initial position being a position of a first node or an occurrence position of a target event, and the target data indicating the target event;

a judging module 1002, configured to judge whether the second node satisfies the parsing conditions or not based on the information of the parsing conditions; and a parsing module 1003, configured to parse the target data as received in a case where the second node satisfies the parsing conditions.

In some embodiments, the initial position is the position of the first node, and the information of the parsing conditions includes a preset distance; and The judging module 1002 is configured to determine whether a distance between a position of the second node and a position of a node sending the information of the parsing conditions is less than or equal to the preset distance in the information of the parsing conditions or not based on a TOF method; and determine that a distance between the position of the second node and the initial position is less than or equal to the target distance in the case that the distance between the position of the second node and the position of the node for sending the information of the parsing conditions is less than or equal to the preset distance in the information of the parsing conditions.

In some embodiments, the target message includes a first sub-message and a second sub-message sent by the first node in sequence, the first sub-message includes the information of the parsing conditions, and the second sub-message includes the target data.

The first receiving module 1001 is configured to receive the first sub-message.

The communication apparatus further includes: a second receiving module (not shown in FIG. 11), configured to receive the second sub-message in the case that the second node satisfies the parsing conditions.

The parsing module 1003 is configured to parse the target data in the second sub-message.

In some embodiments, the communication apparatus further includes a third receiving module (not shown in FIG. 11), configured to receive the target data in the target message sent by the first node.

The communication apparatus further includes a forwarding module (not shown in FIG. 11), configured to forward the target message in the case that the distance between the position of the second node and the initial position is less than the target distance.

In some embodiments, the initial position is the position of the first node, and the information of the parsing conditions includes a preset distance. The judging module is configured to: determine whether the distance between the position of the second node and the position of the node sending the information of the parsing conditions is less than or equal to the preset distance in the information of the parsing conditions or not based on the TOF method; and determine that the distance between the position of the second node and the initial position is less than or equal to the target distance in the case that the distance between the position of the second node and the position of the node for sending the information of the parsing conditions is less than or equal to the preset distance in the information of the parsing conditions.

The communication apparatus further includes a modifying module, configured to modify the preset distance in the information of the parsing conditions before the forwarding module forwards the target message, where a difference between the preset distance in the information of the parsing conditions prior to modification and the preset distance in the information of the parsing conditions after modification is equal to a distance between the position of the second node and the position of the first node.

In some embodiments, the target message further includes a sending period for the target message, and a sending deadline for the target message, and the forwarding module is configured to periodically forward the target message based on the sending period prior to the sending deadline.

In summary, according to the communication apparatus provided in the embodiments of the present disclosure, as the target message sent by the first node includes the information of the parsing conditions, which are related to the distance between the nodes, such that the first node designates the nodes within the target distance to receive and parse the target data, and thus the nodes within the target distance are notified of the target event. In the case that the nodes are vehicles and the target event is related to traffic congestion, the notification related to the traffic congestion is carried out on the vehicles within the target distance, to relieve the traffic congestion.

Figure 12:
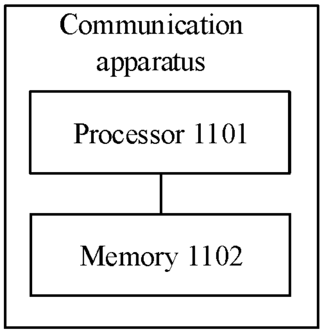
FIG. 12 is a block diagram of a communication device according to some embodiments of the present disclosure.

Embodiments of the present disclosure further provide a communication device. As shown in FIG. 12, the communication device includes a processor 1101 and a memory 1102 having programs stored therein, wherein the processor 1101, when running the programs stored in the memory 1102, is caused to perform the method performed by a first node or a second node in any one of the communication methods provided by the embodiments of the present disclosure.

Embodiments of the present disclosure further provide a computer-readable storage medium having instructions stored therein. The instructions, when executed on a computer, cause the computer to perform the method performed by a first node or a second node in any one of the communication methods provided in the embodiments of the present disclosure.

Embodiments of the present disclosure further provide a computer program product including instructions. The computer program product, when running on a computer, causes the computer to perform the method performed by a first node or a second node in any one of the communication methods provided in the embodiments of the present disclosure.

In the present disclosure, the terms "first", "second" and the like are merely used for descriptive purposes and should not be construed as indicating or implying the relative importance. The term "at least one" means one or more and "a plurality" means two or more unless explicitly defined otherwise.

Different types of embodiments such as the method embodiments and the apparatus/device embodiments provided in the embodiments of the present disclosure are mutually referred to, which is not limited by the embodiments of the present disclosure.

In the corresponding embodiments provided by the present disclosure, it should be understood that the disclosed system and apparatuses, etc. are implemented by other configurations. In some embodiments, the above-described apparatus embodiments are merely illustrative. In some embodiments, the division of the modules is only one type of logical functional division, and other divisions may be realized in practice, in some embodiments, a plurality of modules are combined or integrated into another system, or some features are omitted, or not executed. In addition, the shown or discussed mutual coupling or direct coupling or communication connection is an indirect coupling or communication connection through some interfaces, apparatuses or modules, and is in an electrical, or other form.

Units described as separate parts are or not are physically separate, and parts described as units are or not are physical units, are disposed in one position, or are distributed on a plurality of apparatuses. Some or all of the units can be selected according to actual needs to achieve the purpose of the solutions of the embodiments.

The foregoing are only optional embodiments of the present disclosure, but the scope of protection of the present disclosure is not limited thereto, any person skilled in the art readily thinks of various equivalent modifications or substitutions within the technical scope disclosed in the present disclosure, and these modifications or substitutions shall be covered by the scope of protection of the present disclosure. Therefore, the protection scope of the present disclosure shall be subject to the protection scope of the claims.

What is claimed is:

1. A communication method, being performed by a first node and comprising:

acquiring to-be-transmitted target data;

acquiring information of parsing conditions required to be satisfied by a node for parsing the target data, wherein the parsing conditions comprise that a distance between a position of the node for parsing the target data and an initial position is less than or equal to a target distance, the initial position being a position of the first node or an occurrence position of a target event, and the target data indicating the target event; and broadcasting a target message, wherein the target message comprises the information of the parsing conditions and the target data;

wherein the target message comprises a first sub-message and a second sub-message, the first sub-message comprises the information of the parsing conditions, and the second sub-message comprises the target data; and broadcasting the target message comprises:

broadcasting the first sub-message and the second sub-message sequentially, wherein a second node that receives the target message is configured to first receive the first sub-message, and then receive the second sub-message in response to the second node satisfying the parsing conditions;

wherein the target message further comprises a sending period for the target message and a sending deadline for the target message, and the communication method further comprises:

acquiring the sending period and the sending deadline; and broadcasting the target message repeatedly based on the sending period prior to the sending deadline.

2. The communication method according to claim 1, wherein the information of the parsing conditions comprises the initial position and the target distance, and the initial position is the position of the first node.

3. The communication method according to claim 1, wherein at least one of following conditions is satisfied:

the parsing conditions comprise the node for parsing the target data is disposed at a target orientation of the first node, and the information of the parsing conditions comprises the position of the first node and the target orientation;

the parsing conditions further comprise a moving direction of the node for parsing the target data is a target moving direction, and the information of the parsing conditions comprises the target moving direction;

the parsing conditions further comprise a frequency of receiving the target data by the node for parsing the target data is less than a frequency threshold, and the information of the parsing conditions comprises an identifier of the target message; or the parsing conditions further comprise an identifier of the node for parsing the target data belongs to a node identifier set, and the information of the parsing conditions comprises the node identifier set.

4. A communication device, wherein the communication apparatus comprises: a processor and a memory storing programs therein, wherein the processor, when running the programs stored in the memory, is caused to perform the communication method as defined in claim 1.

5. A non-transitory computer-readable storage medium storing instructions therein, wherein the instructions, when executed on a computer, cause the computer to perform the communication method as defined in claim 1.

6. The communication method according to claim 1, wherein the first node is a vehicle.

7. The communication method according to claim 1, wherein the first node and the second node are both vehicles.

8. A communication method, being performed by a second node and comprising:

receiving information of parsing conditions in a target message, wherein the target message further comprises target data, and the parsing conditions comprise that a distance between a position of a node for parsing the target data and an initial position is less than or equal to a target distance; the initial position being a position of a first node or an occurrence position of a target event, and the target data indicating the target event;

judging whether the second node satisfies the parsing conditions or not based on the information of the parsing conditions; and parsing the target data as received in response to the second node satisfying the parsing conditions;

wherein the target message comprises a first sub-message and a second sub-message sent by the first node in sequence, the first sub-message comprises the information of the parsing conditions, and the second sub-message comprises the target data;

receiving the information of the parsing conditions in the target message comprises:

receiving the first sub-message;

the method further comprises:

receiving the second sub-message in response to the second node satisfying the parsing conditions; and parsing the target data as received comprises:

parsing the target data in the second sub-message;

wherein the target message further comprises a sending period for the target message and a sending deadline for the target message, and the communication method further comprises:

forwarding the target message periodically based on the sending period prior to the sending deadline in a case where a distance between a position of the second node and the initial position is less than the target distance.

9. The communication method according to claim 8, wherein the initial position is the position of the first node, and the information of the parsing conditions comprises a preset distance; and judging whether the second node satisfies the parsing conditions or not based on the information of the parsing conditions comprises:

determining whether a distance between a position of the second node and a position of a node for sending the information of the parsing conditions is less than or equal to the preset distance in the information of the parsing conditions based on a time of flight (TOF) method; and determining that a distance between the position of the second node and the initial position is less than or equal to the target distance in a case where the distance between the position of the second node and the position of the node for sending the information of the parsing conditions is less than or equal to the preset distance in the information of the parsing conditions.

10. The communication method according to claim 8, wherein the initial position is the position of the first node, and the information of the parsing conditions comprises a preset distance;

judging whether the second node satisfies the parsing conditions or not based on the information of the parsing conditions comprises:

determining whether a distance between the position of the second node and a position of the node for sending the information of the parsing conditions is less than or equal to the preset distance in the information of the parsing conditions based on a time of flight (TOF) method; and determining that the distance between the position of the second node and the initial position is less than or equal to the target distance in a case where the distance between the position of the second node and the position of the node for sending the information of the parsing conditions is less than or equal to the preset distance in the information of the parsing conditions; and prior to forwarding the target message, the method further comprises:

modifying the preset distance in the information of the parsing conditions, wherein a difference between the preset distance in the information of the parsing conditions prior to modification and the preset distance in the information of the parsing conditions after modification is equal to a distance between the position of the second node and the position of the first node.

11. A communication apparatus, wherein the communication apparatus comprises: a processor and a memory storing programs therein, wherein the processor, when running the programs stored in the memory, is caused to perform the communication method as defined in claim 8.

12. A non-transitory computer-readable storage medium storing instructions therein, wherein the instructions, when executed on a computer, cause the computer to perform the communication method as defined in claim 8.

* * * * *